United States Patent [19]

Weaver

[11] Patent Number: 5,009,821
[45] Date of Patent: Apr. 23, 1991

[54] MOLDING METHOD FOR ELIMINATING FIBER READOUT

[75] Inventor: William R. Weaver, Toledo, Ohio

[73] Assignee: Libbey-Owens-Ford Co., Toledo, Ohio

[21] Appl. No.: 314,767

[22] Filed: Feb. 23, 1989

[51] Int. Cl.$^5$ .............................................. B29C 45/14
[52] U.S. Cl. ...................................... 264/22; 264/257; 264/265; 264/266; 264/511
[58] Field of Search ..................... 425/112, 127, 129.1; 264/255, 257, 258, 511, 513, 516, 265, 22, 266

[56] References Cited

U.S. PATENT DOCUMENTS

| | | | |
|---|---|---|---|
| 3,137,750 | 6/1964 | Gingras | 264/257 |
| 3,655,597 | 4/1972 | Strassel | |
| 4,201,823 | 6/1980 | Russell | 264/257 |
| 4,267,142 | 5/1981 | Lankheet | |
| 4,405,538 | 9/1983 | Saidla | |
| 4,550,540 | 11/1985 | Thorn | |
| 4,581,393 | 4/1986 | Fortier et al. | |
| 4,664,862 | 5/1987 | Ghayamikia | |
| 4,668,460 | 5/1987 | Ongena | |
| 4,676,041 | 6/1987 | Ford | |
| 4,676,938 | 6/1987 | Karklin et al. | 425/112 |
| 4,714,575 | 12/1987 | Preston | |
| 4,781,876 | 11/1988 | Kia | |
| 4,957,684 | 9/1990 | Kia | 264/257 |

*Primary Examiner*—James Lowe
*Attorney, Agent, or Firm*—Marshall & Melhorn

[57] ABSTRACT

Fiber reinforced molded plastic articles, without fiber readout surface defects, are prepared in either resin transfer molding or reinforced reaction injection molding processes, by disposing a surface finishing film across the mold cavity prior to the insertion of the fiber preform and the injection of the curable polymeric precursor materials, thereby producing a finished article wherein the surface finishing film is bonded to the surface of the article filling the areas between those fibers near the surface which would otherwise cause fiber readout.

22 Claims, 3 Drawing Sheets

MOLDING METHOD FOR ELIMINATING FIBER READOUT

FIELD OF THE INVENTION

This invention relates generally to the elimination of fiber readout during the molding of reinforced plastics, and more particularly, to a process for forming and bonding a surface finishing film to the exterior surface of a fiber reinforced molded plastic article during resin transfer molding or reinforced reaction injection molding.

BACKGROUND OF THE INVENTION

Methods for producing molded plastic articles, which are useful for example for automotive or furniture components or entry way doors, are well known in the art. Typically, such molded plastic components may be manufactured by processes commonly known as "resin transfer molding" (RTM), or "reinforced reaction injection molding" (RRIM), in which a fiber reinforced mat or preform is placed into a mold cavity into which reactive polymeric precursor materials are subsequently injected. The polymeric precursor materials react in situ to form a molded plastic article having fiber reinforcements throughout. Various polymeric precursor materials may be employed, such as for example those which cure in situ to prepare polyurethanes, polyesters, or crosslinked epoxy resins.

Where an aesthetically pleasing surface finish is important, however, the above mentioned processes pose a problem known generally in the art as fiber readout, which is observed at the surface of the fiber reinforced molded plastic article. The readout problem is caused by the presence of continuous fibers near the surface of the molded plastic article. When a reinforced plastic article is molded, and the mold is subsequently parted, the cured viscoelastic polymeric material located at the surface of the article adjacent to a fiber will shrink, causing the surface of the article to reveal the protruding contours of those fibers immediately below the surface of the molded plastic article.

Another contributing factor producing fiber readout is the differential thermal shrinkage that exists between the fibers and the resin. For example, the coefficient of thermal expansion for polymers is generally at least one order of magnitude greater than the coefficient of thermal expansion for glass fibers. As a result when a molded plastic article, utilizing a glass fiber mat or preform, is removed from a mold and allowed to cool to a lower temperature, the glass-rich regions shrink less than the resin-rich regions, which thereby causes the formation of protuberances over the fibers near the surface. It would be desirable to form a fiber reinforced molded plastic article, by the RTM or RRIM process without this fiber readout defect at its surface.

Reaction injection molded polyurethanes are useful polymeric precursor materials for RTM and RRIM processes. U.S. Pat. No. 3,655,597 discloses reacting polyisocyanate, polyol, blowing agent, diamine and catalyst for the manufacture of molded polyurethane components. A detailed description of the RIM process may be found in Prepelka and Wharton "Reaction Injection Molding in the Automotive Industry," Journal of Cellular Plastics, vol. II, no. 2, 1975. The RIM process also has been advantageously employed in the so-called "encapsulated automotive glazing" manufacturing process, wherein a polyurethane gasket is formed around the perimeter of a glazing unit of transparent material such as glass. See U.S. Pat. No. 4,561,625. Resin transfer molding processes utilizing thermoset polyester resins and epoxy resins, are generally disclosed in U.S. Pat. Nos. 4,405,538, issued Sept. 20, 1983, and 4,581,393, issued Apr. 18, 1986, respectively The processes described are useful for manufacturing for example entry way doors having aesthetically pleasing surface finishes which may be subsequently painted or stained. The prior art generally discloses two methods for preparing doors with surfaces free of fiber readout defects.

U.S. Pat. No. 4,676,041, issued June 30, 1981, discloses encapsulating a core wrapped in glass fiber with a liquid catalyzed resin material which impregnates the glass fibers and simultaneously forms the outer skin or shell of the door. In order to prevent fiber readout at the surface of the door, however, the walls of the mold are first coated with the same liquid catalyzed resin material. This is commonly referred to as a "gel coat" process and insures that the surface of the molded plastic article is devoid of glass fibers.

U.S. Pat. No. 4,550,540, issued Nov. 5, 1985, discloses the use of sheet molding compound (SMC) for preparing the exterior surfaces of a compression molded door. The outer surface of the SMC prepreg is essentially devoid of glass fibers to a predetermined depth before the material is compression molded over a central core.

Other prior art exists disclosing methods for preparing surface finishes free from fiber readout defects during plastic article molding operations.

U.S. Pat. No. 4,714,575, issued Dec. 22, 1987, discloses a method for injecting a high viscosity polyurethane resin into the region above a glass fiber preform, while simultaneously injecting a low viscosity polyurethane resin into the region below the glass fiber preform. The low viscosity material penetrates the porous mat to reinforce it, and the porous characteristic of the mat prevents the high viscosity material from entering. In this fashion, a finish surface, produced by the high viscosity resin, may be prepared which excludes the glass fibers and therefore prevents fiber readout.

U.S. Pat. No. 4,664,862 issued May 12, 1987, discloses a method for mechanically restricting glass fibers from the surface of a molded plastic article, by forming one of the mold cavity surfaces with equally spaced closely packed valleys having a truncated pyramid shape. A molded plastic article having a textured surface is thereby produced wherein the glass fibers are excluded from the immediate vicinity of the textured surface This process, however, cannot be used to prepare molded plastic articles having a smooth surface free from fiber readout.

U.S. Pat. No. 4,668,460, issued May 26, 1987, discloses a process for partially curing a molded plastic article within a compression mold, and thereafter injecting a separate layer of a polymeric material onto the surface of the partially cured article without reopening the mold. The secondly injected polymeric material flows evenly over the partially cured article, and thereby provides a finish layer of cured resin containing no glass fibers.

U.S. Pat. No. 4,267,142, issued May 12, 1981, discloses a process wherein a pre-formed plastic structure is placed into a female mold member having a mating contoured surface, and thereafter an SMC prepreg is compression molded against the pre formed plastic structure. This results in a molded plastic article presenting the pre-formed plastic structure as the finished surface, adhered to the SMC prepreg which contains the glass fibers. The glass fibers are thereby isolated from the surface of the finished molded plastic article.

Finally, U.S. Pat. No. 4,781 876, issued Nov. 1, 1988, discloses a process wherein polyurethane resin is injected into a mold cavity containing glass fiber or a glass fiber preform and allowed to partially cure. Thereafter, the mold is opened and a quantity of a coating material is injected onto the hot surface of the partially cured substrate to form a top layer. Next, pressure is applied, to cause the coating material to fill the valleys between the protruding fibers and to flow evenly over the entire surface of the premolded article, thereby preparing a finished surface devoid of glass fibers.

SUMMARY OF THE INVENTION Accordant with the present invention, there is provided a process for the production of a fiber reinforced molded plastic article.

The process comprises the steps of:

(A) providing a mold, including at least two cooperating mold sections, having a cavity therein for forming the fiber reinforced molded plastic article, wherein at least a portion of the mold cavity defines a mold cavity surface adjacent which a finished surface of the plastic article is to be molded;
(B) disposing a surface finishing film across the mold cavity surface;
(C) conforming the surface finishing film to substantially the configuration of the mold cavity surface;
(D) positioning a fiber preform into the mold cavity having the surface finishing film conformed to the surface thereof;
(E) closing the mold; and
(F) injecting polymeric precursor materials into the mold cavity behind the surface finishing film, wherein the polymeric precursor materials fill the mold cavity, impregnating the fiber preform, and simultaneously deform the surface finishing film into intimate contact with the mold cavity surface, the polymeric precursor materials curing in situ adjacent the surface finishing film and bonding thereto;

whereby the surface finishing film provides a finished surface, free of fiber readout on the fiber reinforced molded plastic article.

The surface finishing film may be pretreated to enhance its adhesion to the cured polymeric precursor materials, such as for example by corona discharge or the application of an isocyanate-type adhesive.

Moreover, the surface finishing film may be employed in such a manner so as to conform to substantially the entire surface defined by the mold cavity, thereby providing a finished surface over the entire peripheral surface of the fiber reinforced molded plastic article.

The surface finishing film, while rigid enough to be drawn over a mold section, is generally sufficiently flexible and stretchable to be deformed substantially to the configuration of the surface of the mold cavity by various means. Vacuum means, for example, may be provided for drawing the surface finishing film into conformity with the surface of the mold cavity prior to inserting the fiber preform. Likewise, hot air jets or heating of the mold section itself may be employed to deform the surface finishing film.

The fiber reinforced molded plastic articles manufactured by the process of the present invention are particularly useful for entry way doors and automotive and furniture components.

BRIEF DESCRIPTION OF THE DRAWINGS

The novel features, which are characteristic of the present invention, are set forth with particularity in the appended claims. The invention itself, however both as to structure and method of use, will best be understood from the following description of specific embodiments, when read in connection with the accompanying drawings, in which:

DETAILED DESCRIPTION OF THE PREFERRED EMBODIMENT

Figure 1:
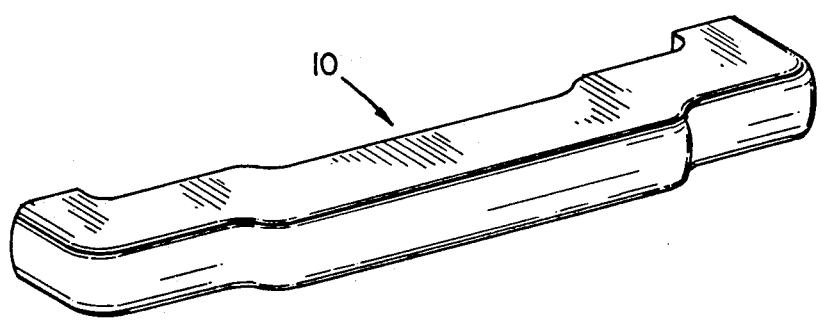
FIG. 1 is a perspective view of a molded plastic article which could be utilized as an automobile bumper, embodying the features of the present invention.

Referring now to the drawings, and particularly FIG. 1, there is shown generally at 10 an example of a fiber reinforced molded plastic article manufactured by and embodying the features of the present invention, and suitable for installation on an automotive vehicle as a bumper. It will readily be appreciated that the fiber reinforced molded plastic articles prepared by the process of the present invention may likewise be of a shape suitable for installation as an automobile body panel, an entry way door, a furniture component, as well as for various other types of fiber reinforced molded plastic articles.

Figure 2:
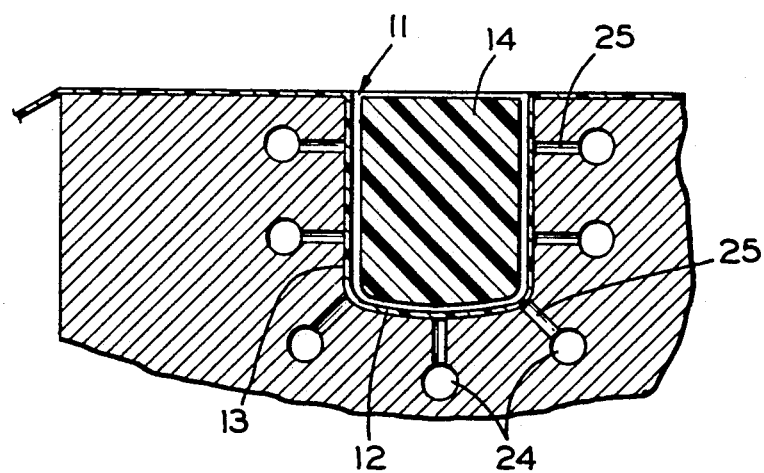
FIG. 2 is an enlarged, fragmentary, sectional view of an embodiment of the present invention, illustrating a lower mold section for preparing the molded plastic article of FIG. 1, incorporating vacuum means to conform the surface finishing film to substantially the configuration of the mold cavity, and illustrating an inserted fiber preform into the mold cavity following the conformation of the surface finishing film thereto.
Figure 3:
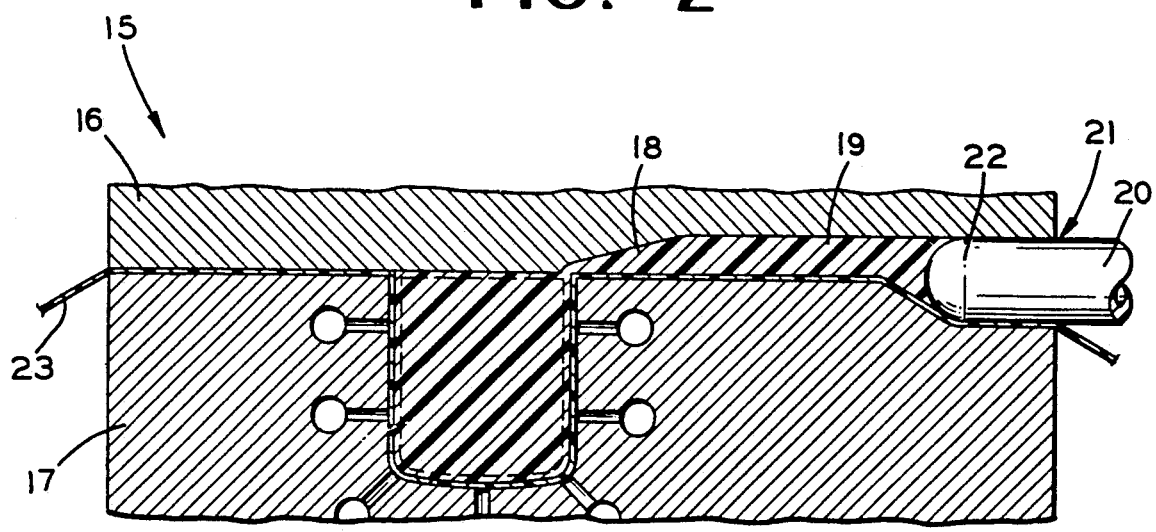
FIG. 3 is a sectional view of the joined upper and lower mold sections for preparing the molded plastic article of FIG. 1, illustrating the intimate contact of the surface finishing film against the mold cavity wall, following the injection of the polymeric precursor materials (thereby impregnating the fiber preform) and during the curing of the fiber reinforced molded plastic article.

More specifically as shown in FIGS. 2 and 3, the fiber reinforced molded plastic article 10 is prepared by a resin transfer molding (RTM) or reinforced reaction injection molding (RRIM) process in which polymeric precursor materials are injected into a mold cavity 11, containing a surface finishing film 12 substantially conformed to the surface of the mold cavity 13, and additionally containing a fiber preform 14.

The polymeric precursor materials impregnate the fiber preform 14, and, due to the pressure of injection and the autogenous pressure generated while curing deform the surface finishing film 12 into intimate contact with the surface of the mold cavity 13.

As illustrated in FIG. 3., a typical mold, indicated generally at 15, comprises cooperating mold sections 16 and 17, including means (not shown) for suitably moving the mold sections 16 and 17 toward and away from each other in a reciprocating fashion, thereby closing and opening the mold 15. The mold sections 16 and 17 together define a mold cavity 11, shown more clearly in FIG. 2 a portion of which defines a surface 13 against which the surface finishing film 12 is received.

The mold cavity 11 communicates as illustrated in FIG. 3, with an inlet means or gate 18 and associated mixing chamber 19 for receiving the polymeric precursor materials as from a positively controlled mixing head 20. Corresponding depressions within the mold sections 16 and 17 define a port 21 for receiving the positively controlled mixing head tip 22, allowing it to communicate with the mixing chamber 19 when the mold 15 is closed. The polymeric precursor materials are adapted to impregnate the fiber preform 14, polymerize or cure in situ within the mold cavity 11, and bond to the surface finishing film 12, to form the fiber reinforced molded plastic article 10.

The process of the present invention may conveniently be practiced by disposing a web 23 of the surface finishing film 12 across one of the mold sections (illustrated in FIG. 3 as having been disposed over mold section 17) and thereby over a portion of the mold cavity 11 defining the surface 13 adjacent which the finished surface of the fiber reinforced plastic article 10 is to be molded.

Next, means to conform the surface finishing film 12 to substantially the configuration of the mold cavity surface 13 are employed. FIG. 2 illustrates the use of vacuum means, whereby the mold section is provided with conduits 24 selectively coupled to vacuum source (not shown). The conduits 24 in turn communicate with a series of passageways 25 spaced along and opening to the mold cavity surface 13. With the mold 15 closed, and the web 23 of surface finishing film in place, application of vacuum through the conduits 24 and associated passageways 25 will draw the surface finishing film 12 substantially against the mold cavity surface 13, causing the film 12 to substantially conform to the shape of the surface 13.

Thereafter, a fiber preform 14 is placed into the mold cavity 11. The fiber preform 14 is generally a woven or nonwoven structure of fibrous material such as for example glass fibers or aramid fibers, shaped to fit substantially into the mold cavity 11. Alternatively the fiber preform 14 can be a rigid closed-cell foam plastic material made for example from polyurethane, wrapped in a fibrous material such as for example glass fiber cloth It is to be understood that essentially any type of conventional fiber preform generally known in the RTM or RRIM arts may be employed in the present invention. A preferred fiber preform typically contains glass fibers.

After closing the mold 15, as illustrated in FIG. 3, the polymeric precursor materials are injected into the mold cavity 11 behind the surface finishing film 12 to impregnate the fiber preform 14 and depress the film 12 into intimate contact with the mold cavity surface 13. By the term "behind the surface finishing film", as it is used herein, is meant that the polymeric precursor materials are injected adjacent the surface of the film 12 which is opposite the surface in substantial contact with the mold cavity surface 13. The autogenous pressure generated by the curing of the polymeric precursor materials within the mold cavity 11 assists in urging the surface finishing film 12 into intimate contact with the mold cavity surface 13, and results in a secure bond between the surface finishing film 12 and the cured polymeric precursor materials.

Figure 4:
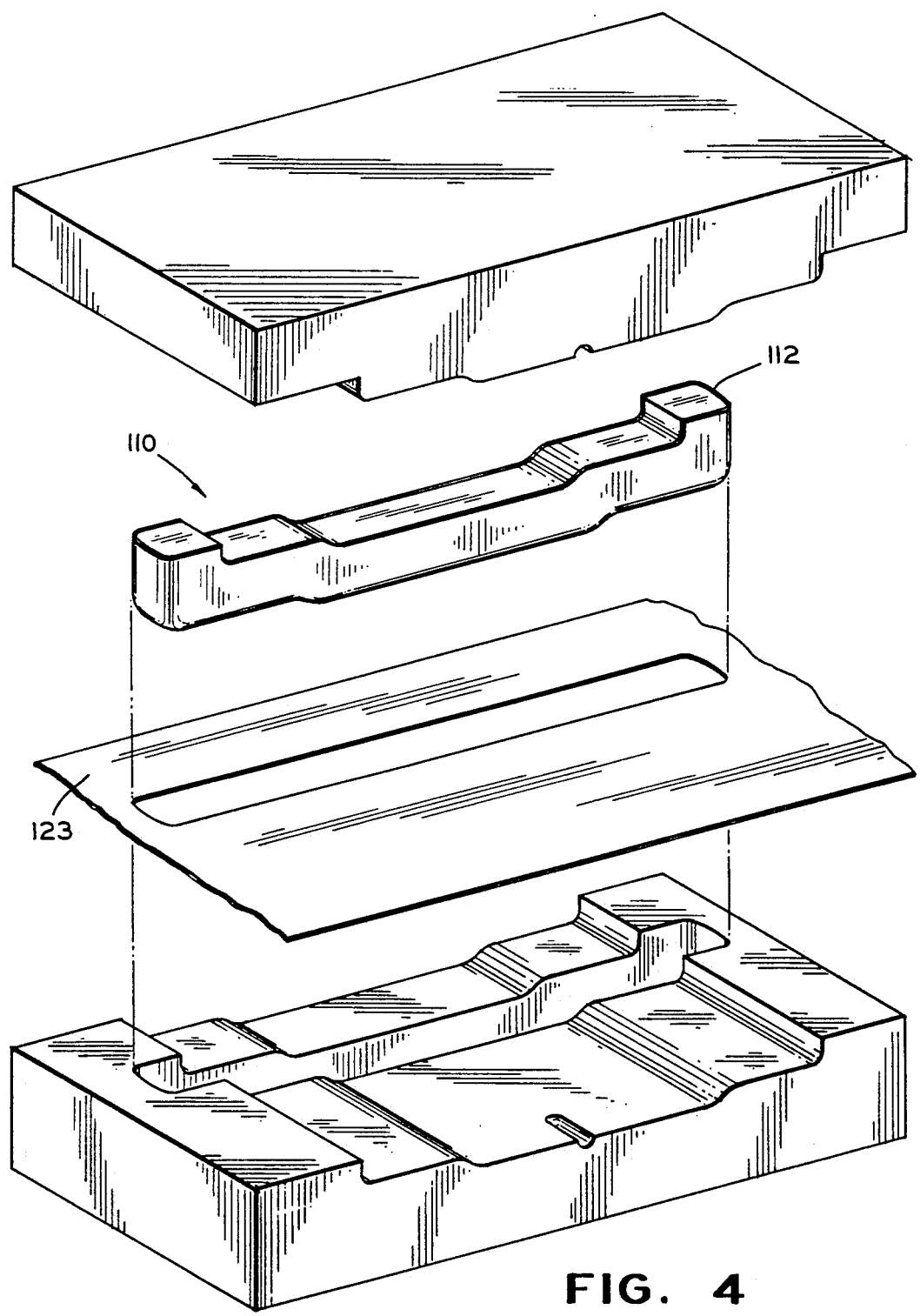
FIG. 4 is an exploded perspective view of the upper and lower mold sections for preparing the molded plastic article of FIG. 1, illustrating the separation of the fiber reinforced molded plastic article, surface finishing film web, and mold sections.

Upon completion of the curing of the polymeric precursor materials and the bonding of the surface finishing film 112 thereto, the fiber reinforced molded plastic article 110, as illustrated in FIG. 4, may be removed from the web 123 such as for example by running a cutting device around the perimeter of the article 110.

Alternative means may be employed to conform the surface finishing film 12 to substantially the configuration of the mold cavity surface 13. For example, jets of hot air may be directed toward the surface finishing film 12 after it is disposed across the mold cavity 11, to impinge against the film 12 and cause it to sag into the mold cavity 11. Also, the mold section 17 itself can be heated to cause the disposed surface finishing film 12, when brought into close proximity to the hot mold section 17, to sag under its own weight into the mold cavity 11. Finally, a combination of "assists", including any or all of the methods discussed hereinabove, may be used to conform the surface finishing film 12 to substantially the configuration of the mold cavity surface 13.

In some cases it is beneficial to treat the surface finishing film 12 prior to its use in the process of the present invention, to enhance the bonding thereof to the cured polymeric precursor materials. Specifically, the surface of the film 12 which is to be adhered to the cured polymeric precursor materials may be treated such as for example by corona discharge, or the application of a pressure sensitive adhesive or primer such as is disclosed for example in U.S. Pat. No. 4,004,050 which is incorporated herein in its entirety by reference thereto. The surface finishing film 12 may alternatively comprise a laminate of two films; one of which easily bonds to the surface of the cured polymeric precursor materials, and the other which presents a pleasing finish on the surface of the fiber reinforced molded plastic article 10.

Where the fiber preform 14 contains glass fibers, the fibers may conveniently be precoated with a sizing material so as to adhere tightly to the impregnating polymeric precursor materials. Suitable sizing agents include, but are not limited to, gamma-glycidoxypropyltrimethoxysilane, gamma-mercaptopropyltrimethoxysilane, gamma-methacryloxypropyltrimethoxysilane, beta-(3,4-epoxycyclohexyl)ethyltrimethoxysilane, vinyl-tris(beta-methoxyethoxy) silane, N-beta-(aminoethyl)-gamma-aminopropyltrimethoxysilane, and the like.

Suitable polymeric precursor materials for manufacturing the fiber reinforced molded plastic articles of the present invention include polyurethane precursors typically used for the reinforced reaction injection molding (RRIM) process. These include isocyanates, such as for example methylene diisocyanate and toluene diisocyanate, and polyols which preferably are either polyether polyols or polyester polyols. Generally the polymeric precursor materials also include various chain extenders and curing agents such as for example diamine compounds either alone or in various blends. Polyurethane precursors typically comprise a two-part composition that is mixed just prior to or upon injection into a mold cavity, so that all or substantially all of the reaction occurs within the mold cavity after injection. One component comprises the isocyanate, and the other component comprises the polyol, chain extender, curing agent, and optional additives. Specific methods for preparing polyurethane precursors useful for the present invention are more fully set forth in U.S. Pat. Nos. 4,218,543 and 4,269,945, which are hereby incorporated in their entirety by reference thereto.

Other suitable polymeric precursor materials include, but are not limited to, crosslinkable polyester and epoxy resins, which are typically employed in resin transfer molding (RTM) processes. The polyester resins generally comprise unsaturated polyesters dissolved in a polymerizable ethylenically unsaturated monomer such as for example styrene, and a crosslinking initiator Useful epoxy resins generally comprise ethers containing the epoxide group and aliphatic polyols, which together cure readily in the presence of amine catalysts. Processes for preparing crosslinkable polyester and epoxy resins are more fully set forth in E.E. Schildknecht, "Polymer Process", vol. X, Interscience Publishers (1956).

The polymeric precursor materials may additionally contain conventional adjuvants, such as for example blowing agents, fillers, thermal stabilizers, dyes, flame retardants, pigments, plasticizers antistatic agents, ultraviolet ray absorbers, lubricants, and the like.

The surface finishing film 12 of the present invention may conveniently be any type of polymeric film generally known in the film art, and is conveniently in the range from about 0.5 to about 15 mils thick. Suitable films include, but are not limited to, polyesters polyurethanes acrylics, polyethers, polyamides, polyethylene, polyvinyl acetate, polyvinyl chloride, styrenics, polypropylene, and the like, as well as copolymers thereof. Preferred surface finishing films are polyesters and polyurethanes.

Useful polyesters, according to the present invention, are generally prepared by condensing aromatic dicarboxylic acids with diols. Suitable dicarboxylic acids include, for example, terephthalic acid, isophthalic acid, naphthalene dicarboxylic acid diphenyletherdicarboxylic acid diphenyl dicarboxylic acid, and the like. The diols suitable for preparation of the polyesters include, for example, ethylene glycol, 1,3-propylene glycol, 1,4-butanediol, 1,5-pentanediol, 1,6-hexanediol, cyclohexane dimethylol, and the like. Specific methods for preparing polyesters and copolyesters are more fully set forth in U.S. Pat. Nos. 2,465,319 and 3,047,539, which are hereby incorporated in their entirety by reference thereto. A most preferred polyester is polyethylene terephthalate.

Those polyurethanes which are useful for preparing the surface finishing film according to the present invention are typically the reaction products of a polyisocyanate and either a polyester diol or polyether diol. Suitable polyisocyanates include 4,4'-methylene-bis-(cyclohexyl isocyanate), 1,4-cyclohexyl diisocyanate 1,4-tetramethylene diisocyanate, 1,6-hexamethylene diisocyanate and the like. Useful polyester diols include the reaction products of aliphatic dicarboxylic acids such as adipic acid, succinic acid, glutaric acid, etc. with aliphatic diols such as ethylene glycol, 1,3-propanediol, 1,4-butanediol, 1,6-hexanediol, and the like. Polyester diols useful for practicing the present invention may additionally be prepared by the reaction of caprolactam monomers such as gammacaprolactone, delta-caprolactone, dialkyl caprolactone, etc. with a suitable glycol such as those previously mentioned. Suitable polyether diols are, for example, polytetramethylene glycol ether, polytrimethylene glycol ether, polyhexamethylene glycol ether, and the like. Specific methods for preparing polyurethanes useful for practicing the present invention are more fully set forth in U.S. Pat. No. 3,900,686, which is hereby incorporated in its entirety by reference thereto.

Figure 5:
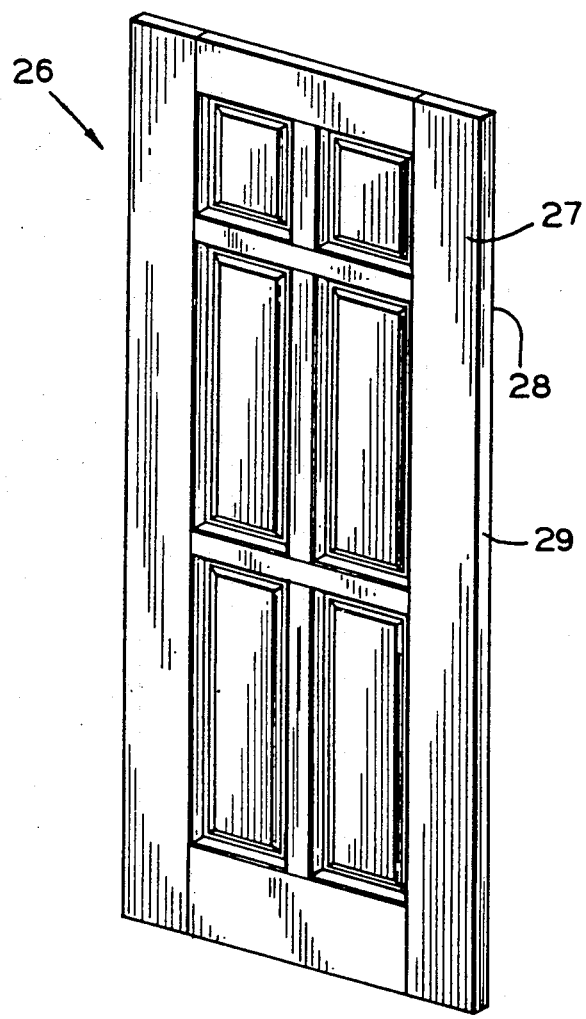
FIG. 5 is a perspective view of a molded plastic article in the form of an entry way door embodying the features of the present invention, wherein the surface finishing film is bonded to the entire peripheral surface of the fiber reinforced molded plastic article.

FIG. 5 illustrates a fiber reinforced molded plastic article incorporating the features of the present invention, suitable for installation in an entry way as a door 26. The door has opposed front and back surfaces 27 and 28, respectively, and an interior core 29 therebetween. The door 26 may be manufactured by the process of the present invention, utilizing a surface finishing film 12 in the entire mold cavity 11, to prepare a fiber reinforced molded plastic article having either a smooth finish or simulated wood grain finish. In either case, fiber readout from the fiber preform (not shown) is eliminated utilizing the process of the present invention.

Figure 6:
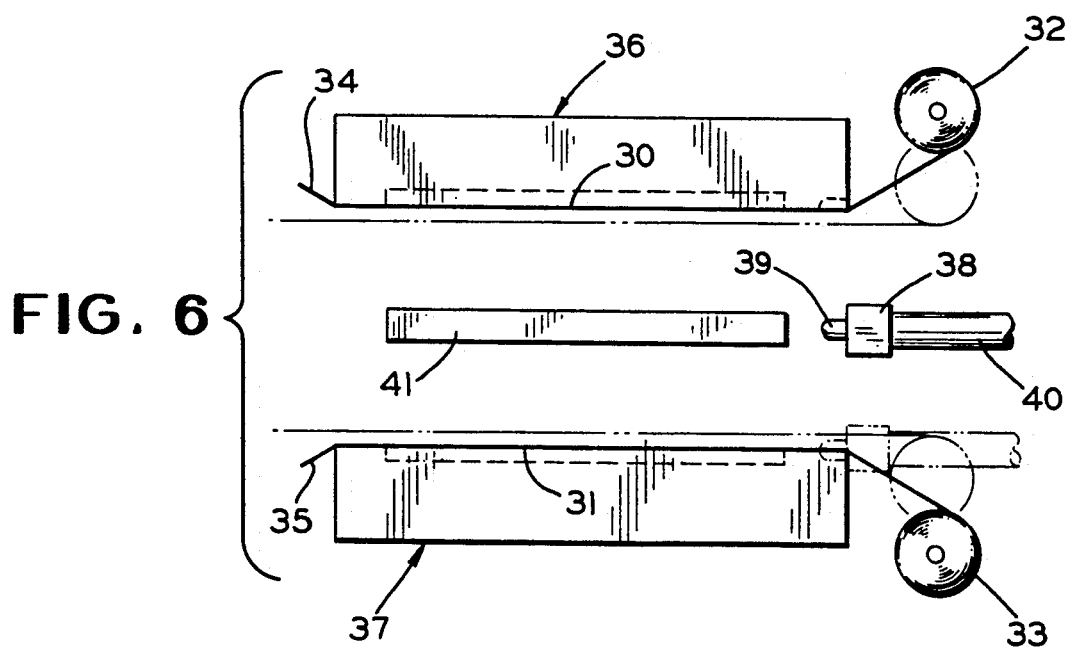
FIG. 6 is a schematic side elevational view of an apparatus for positioning the surface finishing film into both mold cavities of a two section mold.

FIG. 6 schematically illustrates an apparatus useful for practicing the present invention for manufacturing the door 26 illustrated in FIG. 5. Provision is made for employing a surface finishing film 30 and 31 in both halves of a twosection mold. Thus, there are shown supply rolls 32 and 33 from which webs 34 and 35 of surface finishing film 30 and 31 are drawn across the mold sections 36 and 37, respectively. Of course, the surface finishing film may alternatively be disposed over one or all of the mold sections in the form of individual sheets of the film material. Also illustrated is a vertically movable positively controlled mixing head 38, having an injection tip 39, connected to a control arm 40. The control arm 40 is adapted to move vertically by conventional mechanical means (not shown), from a first position between the spaced apart mold sections 36 and 37, as illustrated by solid lines in FIG. 6, to a second position indicated by broken lines wherein the tip 39 is received into the port formed by corresponding depressions within the upper and lower mold sections 36 and 37, respectively, when the mold is closed by conventional mechanical means (not shown).

In operation, the webs 34 and 35 are drawn over the mold sections 36 and 37, respectively, as shown by the broken lines in FIG. 6. Thereafter, the supply rolls 32 and 33 and the webs 34 and 35 are repositioned so as to contact the webs 34 and 35 against the mold sections 36 and 37, respectively, as illustrated by solid lines in FIG. 6. The surface finishing films 30 and 31 are then conformed to substantially the shape of the surfaces of the mold cavity, and the fiber preform 41 is placed into the mold cavity of the lower mold 37. The mold sections 36 and 37 are thereafter brought together, and simultaneously, the positively controlled mixing head 38 is lowered to the position indicated by broken lines in FIG. 6, such that the tip 39 is enclosed by the port formed as the corresponding depressions in the mold sections 36 and 37 are brought together.

The closed mold thereafter contains surface finishing film 30 and 31, positioned substantially adjacent the entire surface of the mold cavity, and a fiber preform 41 enclosed therewithin. Furthermore, the positively controlled mixing head tip 39 is positioned so as to permit the injection of polymeric precursor materials into the mold chamber, between the surface finishing films 30 and 31. As the polymeric precursor materials are injected into the mold cavity to impregnate the fiber preform, and during the cure or polymerization of the injected materials which generates autogenous pressure, the surface finishing films 30 and 31 are further deformed into intimate contact with the surface of the mold cavity and bond to the cured polymeric precursor materials.

The finished surfaces produced on the fiber reinforced molded plastic articles of the present invention may subsequently be painted, stained or otherwise treated to enhance their aesthetic qualities.

The invention is more easily comprehended by reference to the specific embodiments contained herein, which are representative of the invention. It must be understood, however, that these specific embodiments are provided only for the purposes of illustration and understanding, and that the invention may be practiced otherwise than as specifically illustrated and described without departing from its spirit and scope.

What is claimed is:

1. A process for preparing a fiber reinforced molded plastic article, comprising the steps of:
   (A) providing a mold, including at least two cooperating mold sections, having a cavity therein for forming the fiber reinforced molded plastic article, wherein at least a portion of the mold cavity defines a mold cavity surface adjacent which a finished surface of the plastic article is to be molded;
   (B) disposing a surface finishing film across the mold cavity surface;
   (C) conforming the surface finishing film to substantially the configuration of the mold cavity surface;
   (D) positioning a fiber preform into the mold cavity having the surface finishing film conformed to the surface thereof, the fiber preform having substantially the same configuration as the mold cavity;
   (E) closing the mold;
   (F) injecting polymeric precursor materials into the mold cavity behind the surface finishing film, wherein the polymeric precursor materials fill the mold cavity and simultaneously:
      (i) impregnate the fiber preform to form a molded fiber preform; and
      (ii) deform the surface finishing film into intimate contact with the mold cavity surface; and
   (G) curing the polymeric materials inside the mold, thus allowing the surface finishing film to maintain intimate contact with the mold surface while bonding the surface finishing film o the molded fiber preform;

whereby the surface finishing film provides a finished surface, whose outside shape matches the inside of the mold surface, and is free from fiber readout, on the fiber reinforced molded plastic article.

2. The process for preparing a fiber reinforced molded plastic article, according to claim 1, wherein the finishing film is conformed to substantially the entire mold cavity surface.

3. The process for preparing a fiber reinforced molded plastic article, according to claim 1, wherein step B comprises drawing a web of the surface finishing film across the mold cavity.

4. The process for preparing a fiber reinforced molded plastic article, according to claim 1, wherein step B comprises placing a sheet of the surface finishing film across the mold cavity surface.

5. The process for preparing a fiber reinforced molded plastic article, according to claim 1, wherein step C comprises applying a vacuum to the mold cavity surface.

6. The process for preparing a fiber reinforced molded plastic article, according to claim 1, wherein step C comprises directing jets of hot air onto the surface finishing film.

7. The process for preparing a fiber reinforced molded plastic article, according to claim 1, wherein step C comprises heating the mold section and positioning the surface finishing film in close proximity thereto.

8. The process for preparing a fiber reinforced molded plastic article, according to claim 1, wherein the polymeric precursor materials are selected from the group consisting of precursors suitable for preparing polyurethanes, polyesters and crosslinked epoxy resins.

9. The process for preparing a fiber reinforced molded plastic article, according to claim 1, wherein the surface finishing film is selected from the group consisting of polyesters, polyurethanes, acrylics, polyethers, polyamides, polyethylene, polyvinyl acetate, polyvinyl chloride, styrenics, and polypropylene.

10. The process for preparing a fiber reinforced molded plastic article, according to claim 9, wherein the surface finishing film has a thickness from about 0.5 to about 15 mils.

11. The process for preparing a fiber reinforced molded plastic article, according to claim 10, wherein the surface finishing film is selected from the group consisting of polyesters and polyurethanes.

12. The process for preparing a fiber reinforced molded plastic article, according to claim 9, wherein the surface finishing film is treated to enhance its bonding to the polymeric precursor materials.

13. The process for preparing a fiber reinforced molded plastic article, according to claim 12, wherein the treatment comprises corona discharge.

14. The process for preparing a fiber reinforced molded plastic article, according to claim 12, wherein the treatment comprises the application of a material selected from the group consisting of a pressure sensitive adhesives and primers.

15. The process for preparing a fiber reinforced molded plastic article, according to claim 1, wherein the fiber preform contains glass fibers.

16. The process for preparing a fiber reinforced molded plastic article, according to claim 15, wherein the glass fibers are sized with a material selected from the group consisting of gamma-glycidoxypropyltrimethoxysilane, gamma-mercaptopropyltrimethoxysilane, gamma-methacryloxypropyltrimethoxysilane, beta-(3,4-epoxycyclohexyl)ethyltrimethoxysilane, vinyltris(beta-methoxyethoxy) silane, N-beta(aminoethyl)-gamma-aminopropyltrimethoxy-silane, and the like.

17. A process for preparing a fiber reinforced molded plastic article, comprising the steps of:
   (A) providing a mold, including at least two cooperating mold sections, having a cavity therein for forming the fiber reinforced molded plastic articles, wherein at least a portion of the mold cavity defines a mold cavity surface adjacent which a finished surface of the plastic article is to be molded;
   (B) disposing a surface finishing film across the mold cavity surface, the film having a thickness from about 0.5 to about 15 mils, and selected form the group consisting of polyesters and polyurethanes;
   (C) conforming the surface finishing film to substantially the configuration of the mold cavity by applying a vacuum to the mold cavity surface;

(D) positioning a glass fiber preform into the mold cavity having the surface finishing film conformed to the surface thereof, the fiber preform having substantially the same conformation as the mold cavity;

(E) closing the mold;

(F) injecting polymeric precursor materials, selected from the group consisting of precursors for the preparation of polyurethanes, polyesters and cross-linked epoxy resins, into the mold cavity behind the surface finishing film, wherein the polymeric precursor materials fill the mold cavity and simultaneously:

(i) impregnate the fiber preform to form a molded fiber preform; and (ii) deform the surface finishing film into intimate contact with the mold cavity surface; and (G) curing the polymeric materials inside the mold, thus allowing the surface finishing film to maintain intimate contact with the mold surface mold while bonding the surface finishing film to the molded fiber preform;

whereby the surface finishing film provides a finished surface, whose shape matches the inside of the mold surface, and is free from fiber readout, on the fiber reinforced molded plastic article.

18. The process for preparing a fiber reinforced molded plastic article, according to claim 17, wherein the surface finishing film is conformed to substantially the entire mold cavity surface.

19. The process for preparing a fiber reinforced molded plastic article, according to claim 17, wherein prior to step C, the surface finishing film is treated by corona discharge 20. The process for preparing a fiber reinforced molded plastic article, according to claim 17, wherein prior to step C, the surface finishing film is treated by the application of a material selected from the group consisting of pressure sensitive adhesives and primers.

21. The process for preparing a fiber reinforced molded plastic article, according to claim 17, wherein the surface finishing film is disposed by drawing a web of the surface finishing film across the mold cavity.

22. The process for preparing a fiber reinforced molded plastic article, according to claim 17, wherein the surface finishing film is disposed by placing a sheet of the surface finishing film across the mold cavity surface.

* * * * *